United States Patent
Lee et al.

(10) Patent No.: US 7,287,054 B2
(45) Date of Patent: Oct. 23, 2007

(54) SYSTEMS AND METHODS FOR SHARED BROWSING AMONG A PLURALITY OF ONLINE CO-USERS

(75) Inventors: Oliver Lee, Redmond, WA (US);
Christopher J. Araman, Seattle, WA (US); Quji Guo, Kirkland, WA (US);
Cees van Dok, Bellevue, WA (US);
Joel K. Grossman, Seattle, WA (US);
Brian D. Wentz, Seattle, WA (US);
Jordan L. K. Schwartz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 10/160,848

(22) Filed: May 31, 2002

(65) Prior Publication Data

US 2003/0225836 A1    Dec. 4, 2003

(51) Int. Cl.
*G06F 15/16* (2006.01)
*G06F 3/00* (2006.01)

(52) U.S. Cl. .................. 709/204; 709/205; 709/208; 709/227; 715/738

(58) Field of Classification Search .............. 709/203, 709/204, 205, 206, 227, 231, 245; 715/738
See application file for complete search history.

(56) References Cited

U.S. PATENT DOCUMENTS

| | | | |
|---|---|---|---|
| 5,206,934 A | 4/1993 | Naef, III .................. 395/200 |
| 5,568,181 A | 10/1996 | Greenwood et al. .......... 348/7 |
| 5,778,398 A | 7/1998 | Nagashima et al. ........ 707/501 |
| 5,862,330 A * | 1/1999 | Anupam et al. ............ 709/204 |
| 5,944,791 A * | 8/1999 | Scherpbier .................. 709/218 |
| 5,977,989 A | 11/1999 | Lee et al. .................... 345/503 |
| 6,009,469 A * | 12/1999 | Mattaway et al. .......... 709/227 |
| 6,240,444 B1 | 5/2001 | Fin et al. .................... 709/205 |
| 6,295,551 B1 * | 9/2001 | Roberts et al. ............. 709/205 |
| 6,310,632 B1 | 10/2001 | Monroe et al. ............. 345/808 |
| 6,360,250 B1 * | 3/2002 | Anupam et al. ............ 709/204 |
| 6,871,213 B1 * | 3/2005 | Graham et al. ............. 709/205 |
| 7,139,799 B2 * | 11/2006 | Qian et al. .................. 709/205 |
| 7,149,776 B1 * | 12/2006 | Roy et al. ................... 709/205 |
| 2002/0023134 A1 * | 2/2002 | Roskowski et al. ......... 709/206 |

(Continued)

OTHER PUBLICATIONS

Ronald Baecker et al., "The User-centered Iterative Design Of Collaborative Writing Software", 1993, CHI '93: Proceedings of the SIGCHI conference on Human factors in computing systems, pp. 399-405.*

(Continued)

*Primary Examiner*—Glenton B. Burgess
*Assistant Examiner*—Aaron Strange
(74) *Attorney, Agent, or Firm*—Woodcock Washburn LLP (57) ABSTRACT

Systems and methods for establishing and maintaining a shared browsing experience are disclosed. A method for establishing a shared browsing experience includes an inviter computer communicating to an invitee computer, via an online messenger communication path, an invitation to establish a co-browsing experience. The invitee computer communicates to the inviter computer, via the first communication path, an acceptance of the invitation. A co-browsing communication path is then established between the inviter computer and the invitee computer. Information relating to the shared browsing experience is then communicated between the inviter and invitee computers via the co-browsing communication path.

12 Claims, 7 Drawing Sheets

U.S. PATENT DOCUMENTS

| | | | |
|---|---|---|---|
| 2002/0032731 A1* | 3/2002 | Qian et al. | 709/204 |
| 2002/0198941 A1* | 12/2002 | Gavrilescu et al. | 709/205 |
| 2003/0041108 A1* | 2/2003 | Henrick et al. | 709/205 |
| 2003/0059378 A1* | 3/2003 | Libin | 424/49 |
| 2003/0061286 A1* | 3/2003 | Lin | 709/205 |
| 2003/0177184 A1* | 9/2003 | Dickerman et al. | 709/204 |

OTHER PUBLICATIONS

Carl Gutwin et al., "A Usability Study of Awareness Widgets in a Shared Workspace Groupware System", 1996, In Computer-Supported Cooperative Work, pp. 258-267.*

Aoki, Y., "Collaborative environment for supporting web users," *IEEE*, 2001, 4, 2309-2316.

Huang, R., et al., "A java technology based shared browser for tele-lecturing in University21," *IEEE*, 2001, 298-302.

Kobayashi, M., et al., "Collaborative customer services using synchronous web browser sharing," *ACM*, 1998, 99-108.

Parnes, P., et al., "mSTAR: Enabling collaborative applications on the internet," *IEEE*, Sep.-Oct. 2000, 4(5), 32-39.

Semenza, G.L., "HIF-1: Using two hands to flip the angiogenic switch," *Cancer and Metastasis Reviews*, 2000, 19, 59-65.

Souya, T., et al., "Joint class experiments based on realtime web-browser synchronization," *PROC 3$^{rd}$ Asia Pacific Computer Human Interaction*, 1998, 98EX110, 367-372.

* cited by examiner

FIG. 7

SYSTEMS AND METHODS FOR SHARED BROWSING AMONG A PLURALITY OF ONLINE CO-USERS

CROSS-REFERENCE TO RELATED APPLICATIONS

The subject matter disclosed herein is related to the subject matter disclosed in co-pending U.S. patent application Ser. No. 10/160,846, filed May 31, 2002, entitled "Systems And Methods For Sharing Dynamic Content Among A Plurality Of Online Co-Users," the contents of which are hereby incorporated herein by reference.

TECHNICAL FIELD

This invention relates to Web browsing. More particularly, the invention relates to systems and methods for enabling a plurality of online co-users to establish and share a common browsing experience.

BACKGROUND OF THE INVENTION

The Internet is a worldwide computer network via which computer systems communicate using the well-defined Internet Protocol (IP). Computers that are connected directly to the Internet each have a unique Internet address. Typically, each computer is assigned a unique IP address so that no two machines have the same IP address. To simplify Internet addressing, the Domain Name System (DNS) allows users to access Internet resources with a simpler alphanumeric naming system. An Internet Domain name includes a series of alphanumeric names separated by periods. To further define the addresses of resources on the Internet, the Universal Resource Locator system was created. A Universal Resource Locator (URL) is a descriptor that specifically defines a type of Internet resource and its location. Resources on the Internet are uniquely addressable by their URL.

Typically, a user navigates the Internet using a browser residing on the user's computer. The browser is an operating system component or application program that allows the user to retrieve documents from the World Wide Web (or simply "the Web") using simple point-and-click commands. Typical browsers allow for multimedia presentation of stored data including text images, sound clips, and video clips. This allows the user to connect to different Web sites on the Internet.

The Web is a collection of files or "Web pages" that include text, graphics, and other forms of content. Typically, a Web page is connected by hyper-links to other Web pages. Using a mouse to click on a hyper-link initiates a process that locates and retrieves the linked Web page, regardless of the physical location of that page.

The Web uses the client-server model to communicate information between client computers and server computers. The terms "client" and "server" are used to refer to a computer's general role as a requester of data (the client) or provider of data (the server). In the Web environment, browsers reside in clients and Web pages reside in servers. Clients and servers communicate with one another using the Hypertext Transfer Protocol (HTTP). A browser opens a connection to a server and initiates a request for a Web page. The server delivers the requested Web page, typically in the form of a text document coded in a standard Hypertext Markup Language (HTML) format.

To access an initial Web page, the user enters the URL for a Web document into the browser, or selects the URL from a list of "favorites" (which is typically stored on the client's hard drive). The browser then sends an HTTP request to the server that has the Web document corresponding to the URL, and the Web server responds to the HTTP request by sending the requested HTTP object to the client.

One application, known as a "customizable home page," permits users, upon the request of a server, to make certain choices. When a user who has done so contacts that server at a later date, the server assembles information for downloading to the user in accordance with the previously selected choices. The server delivers a Web page with a response header that creates an ID field located in a file on the client computer (this file is known as the "client ID" or "cookie" file) to include information about the user's preferences. When the user later returns to a specified URL, on the same server, the cookie with the previously-set preference information is transmitted in the HTTP request header to the server, which can then return a Web page that is assembled according to the user-specific information.

Network based communication services that track a plurality of online co-user accounts and provide communication pathways to interconnect two or more such online co-user accounts are also well known. Examples of such network based communication services include electronic mail ("email") and online messaging services such as instant message services. Such communication services can maintain lists of user accounts, and even track current status information about the user accounts, such as whether the accounts are active (i.e., the user is currently online).

Online messaging services, for example, typically provide and maintain user definable online co-user lists, which are more commonly referred to as "contacts" lists. A number of companies operate host systems that include online message services that alert users when other pre-specified co-users (i.e., other users of the online message service that have been previously specified by the user as a contact) are online (i.e., concurrently accessing the online messaging service). Such online co-users can typically use the online messaging service to send "instant messages" to one another via a communication path that the online messaging service provides.

There are certain situations in which a user of a client computer would benefit from being able to navigate the Web together with one or more online co-users, or "contacts." Each of the co-users would benefit from being able to share the other's browsing experience, such that, when either user navigates to a Web site, the other would follow along automatically. Hence, there is a need in the art for systems and methods for enabling a plurality of online co-users to establish and share a common browsing experience.

SUMMARY OF THE INVENTION

The invention provides systems and methods for enabling a plurality of online co-user client computers to establish and maintain a co-browsing experience. A method according to the invention includes an inviter computer communicating to an invitee computer, via a first communication path, an invitation to establish a co-browsing experience. The invitee computer receives the invitation and communicates to the inviter computer, via the first communication path, an acceptance of the invitation. A co-browsing communication path between the inviter computer and the invitee computer is established, and information relating to the co-browsing experience is communicated between the inviter computer and the invitee computer via the co-browsing communication path.

To establish the co-browsing communication path, the inviter computer communicates to the invitee computer, via the first communication path, a connection message that identifies an available port of the inviter computer. The invitee computer communicates a reply to the inviter computer, thereby establishing the co-browsing communication path. If the reply is not received at the inviter computer, the invitee computer communicates a connection message to the inviter computer via the first communication path. The inviter computer sends a reply message to the invitee computer via an available port of the inviter computer, thereby defining the co-browsing communication path to be established.

A method according to the invention also includes providing within a browser window at one of the client computers a remote cursor indicator, such as a ghosted cursor, for example, that represents a current position of a cursor within a browser window at the other client computer. Such a method can also include providing a remote scroll bar indicator, such as a ghosted scroll bar, for example, at a position within a browser window at one of the client computers that corresponds to a current scroll position of a web page within a browser window at the other client computer.

A status display may also be provided at one of the client computers that provides a current status of a browsing experience at the other client computer. The status display can include status relating to load progress of a web page being downloaded onto the other client computer, status relating to online messenger status, or a friendly name associated with a pre-specified user of the other computer.

BRIEF DESCRIPTION OF THE SEVERAL VIEWS OF THE DRAWING

Other features of the invention are further apparent from the following detailed description of the embodiments of the present invention taken in conjunction with the accompanying drawing.

DETAILED DESCRIPTION OF THE INVENTION

Exemplary Computing Device

Figure 1:
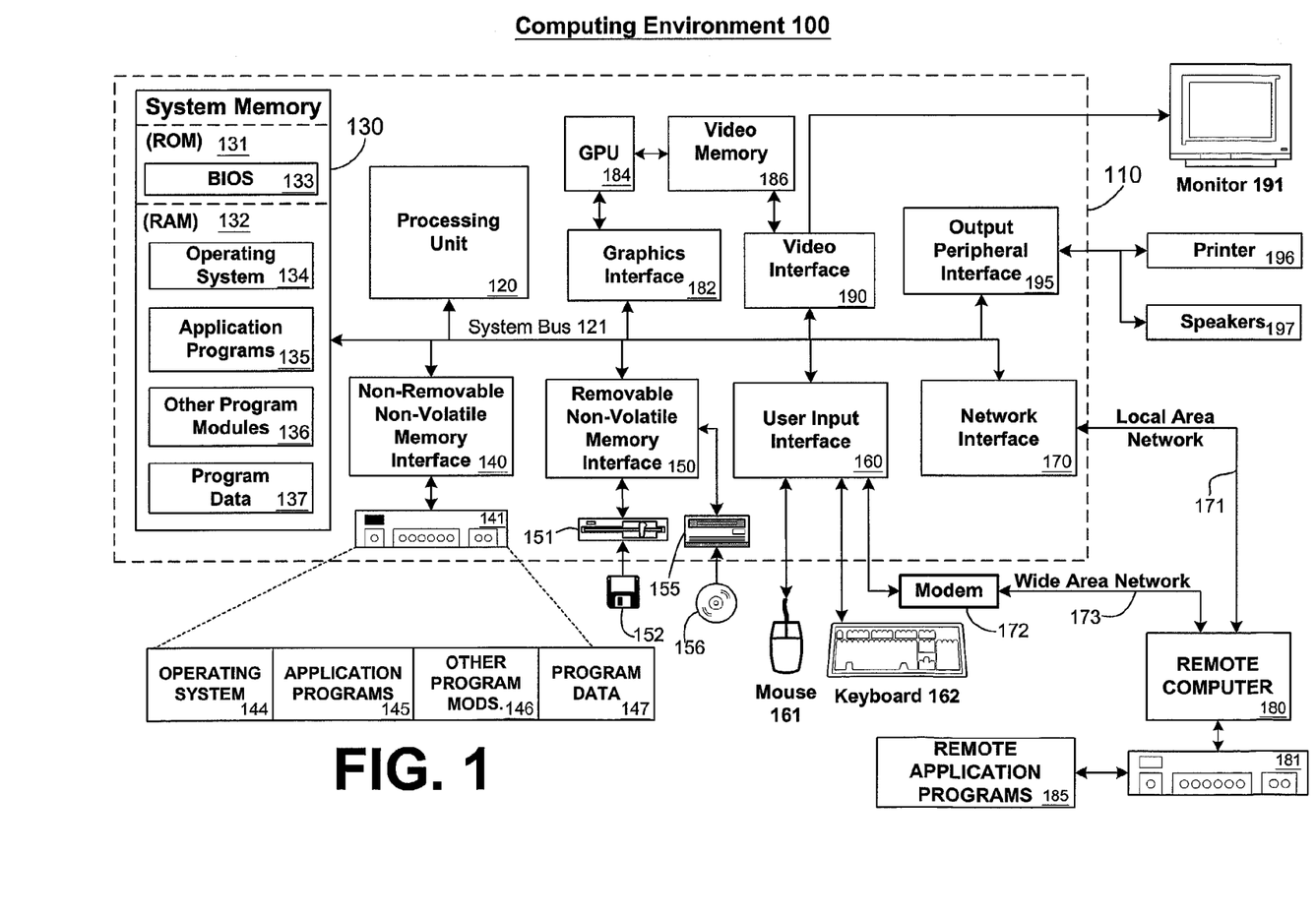
FIG. 1 is a block diagram representing an exemplary non-limiting computing device in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 2:
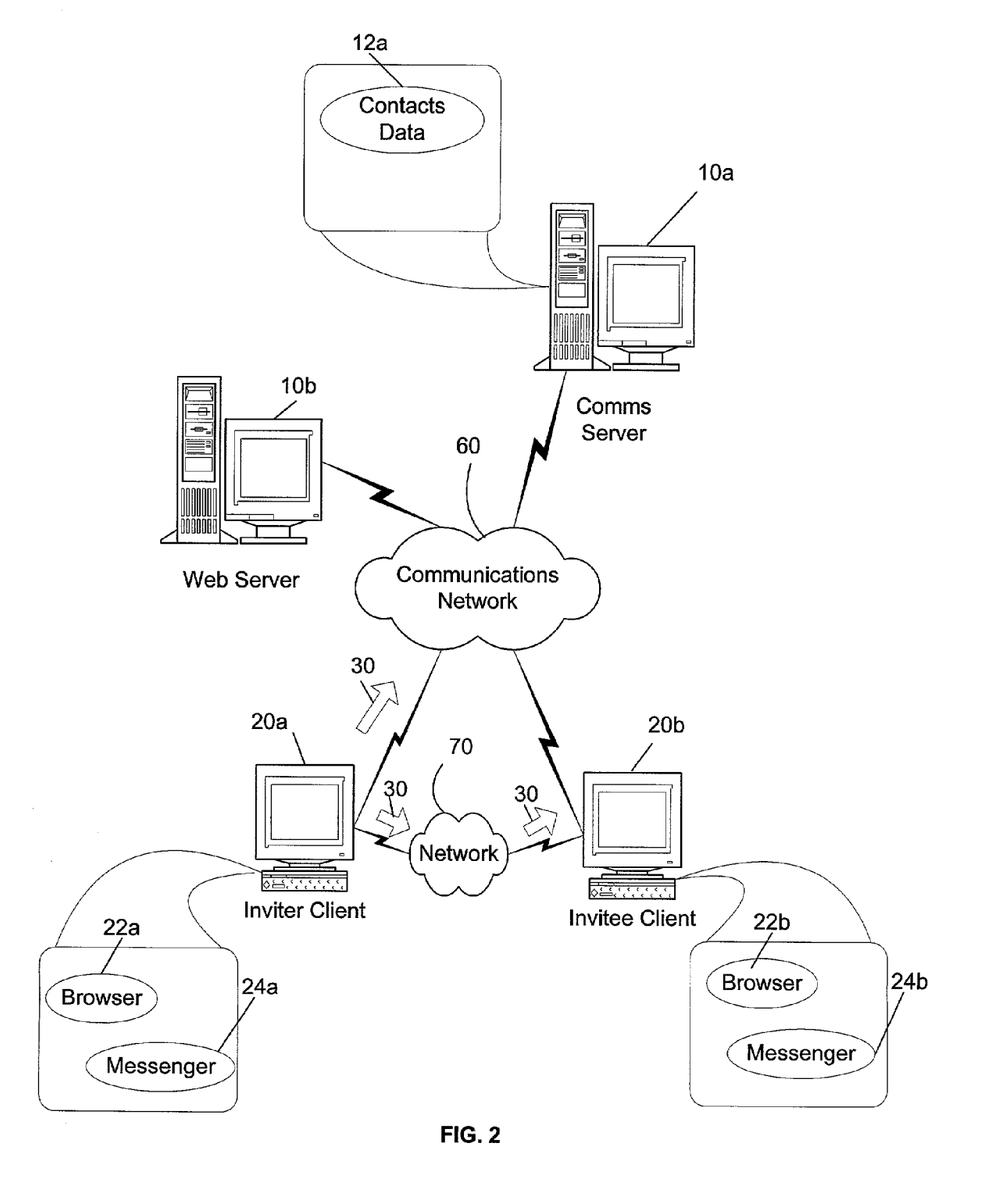
FIG. 2 is a block diagram representing an exemplary network environment having a variety of computing devices in which the present invention may be implemented.

Methods and Systems for Enabling Multiple Online Co-Users to Share a Browsing Experience FIG. 2 illustrates an exemplary network environment in which the present invention may be employed. As shown in FIG. 2, a network based communications server 10a and a web server 10b are in communication with client computers 20a, 20b via a communication network 60. It should be understood that any number of servers and clients can be interconnected via the communications network 60. The communications network can be a LAN, WAN, intranet, or the Internet, etc. In a preferred embodiment, the communication network is the Internet. It should further be understood that any number of remote computing devices, or clients, can be interconnected via the communications network 60. The clients 20a, 20b can be, for example, desktop computers, portable computers, handheld computers, thin clients, networked appliances, or other devices, such as VCRs, TVs, and the like. It is thus contemplated that the invention may apply to any computing device in connection with which it is desirable to establish a shared browsing session.

In a network environment in which the communications network 60 is the Internet, for example, the servers 10a, 10b can be Web servers with which the clients 20a, 20b communicate via any of a number of known protocols such as hypertext transfer protocol (HTTP). Communications may be wired or wireless, where appropriate. Client devices 20a, 20b may or may not communicate via communications network 60, and may have independent communications associated therewith. For example, in the case of a TV or VCR, there may or may not be a networked aspect to the control thereof. Each client computer 20a, 20b and server computer 10a, 10b may be equipped with various application program modules and with connections or access to various types of storage elements or objects, across which files may be stored or to which portion(s) of files may be downloaded or migrated. Any server 10a, 10b may be responsible for the maintenance and updating of a database or other storage element in accordance with the present invention, such as a database for storing contacts data according to the invention. Thus, the invention can be utilized in a computer network environment having client computers 20a, 20b that can access and interact with a computer network 60, and server computers 10a, 10b that may interact with client computers 20a, 20b and other such devices and databases.

According to the invention, each client computer 20a, 20b interfaces with the communication network 60 via a respective browser 22a, 22b. The browser 22a, 22b enables the user at the client 20a, 20b to access certain sites on the servers 10a, 10b. Where network 60 is the Internet, the servers 10a, 10b are Web servers and the sites are known as "Web sites." Currently, a number of browsers 22a, 22b are commercially available for personal computers and other types of client computers 20a, 20b (such as hand-held computers, palm-sized computers, or any other type of computer that can be used for browsing).

Each client computer 20a, 20b can also include a cookie file (not shown) that includes information the respective clients 20a, 20b need to access certain sites on the servers 10a, 10b. In particular, some Web sites require the client to provide a username and password, for example, before the corresponding server 10a, 10b will download content from the Web site onto the client 20a, 20b. Typically, these usernames and passwords, along with other access information, such as registration numbers, etc., are included in the client's cookie file. When the user enters a URL for a Web site that requires cookie data, the server 10a, 10b requests the cookie data from the client 20a, 20b. In response, the browser 22a, 22b gathers the required cookie data from the cookie file and provides the cookie data to the server 10a, 10b. Assuming the cookie data is correct, the server 10a, 10b then delivers the content from the Web site to the client 20a, 20b.

As shown in FIG. 2, each client computer 20a, 20b also includes a respective online messenger 24a, 24b via which the user of the computer can access an online message service provided via the communications server 10a. In a preferred embodiment, the communications server is a messenger server includes a data store 12a that contains contacts data used for providing the online message service. A separate contacts file can be maintained for each user that is a subscriber to the online message service. Each contacts file can include contacts data relating to the user's ID and password, the IDs and friendly names of the co-users (i.e., "contacts") that the user has pre-specified for the service. The online message service provides to the user at the inviter client, for example, a contacts list that indicates which, if any, of the pre-specified co-users is currently online. That is, the online message service determines which, if any, of the co-users accounts is currently active by determining whether the co-user has logged into the online message service. The message server also determines an IP address of the computer on which the co-user account is currently active. Typically, a messenger server can only "see" an externally-visible IP address of a client computer. For example, in the case where one user is behind a NAT (network address translator), that computer's actual IP address is different from the one that the messenger server sees. Thus, the online message service "knows" which co-users are currently online, and on what computer they are connected to the network. Accordingly, the online message service can provide this information to the client computers on which the co-user accounts are currently active. Any of the co-users can then initiate an instant message session with any other co-user(s) via the user interface that the online message service provides.

Client 20a is referred to as an inviter client, and client 20b is referred to as an invitee client. For purposes of this specification, the term "inviter" refers to the user that initiates a co-browsing experience by offering an invitation to an online co-user to establish the co-browsing experience. The term "invitee" refers to the user that accepts the invitation to establish a co-browsing experience. The terms inviter computer and inviter client refer to the computer via which the inviter is communicating with the network. The terms invitee computer and invitee client refer to the computer via which the invitee is communicating with the network.

Figure 3:
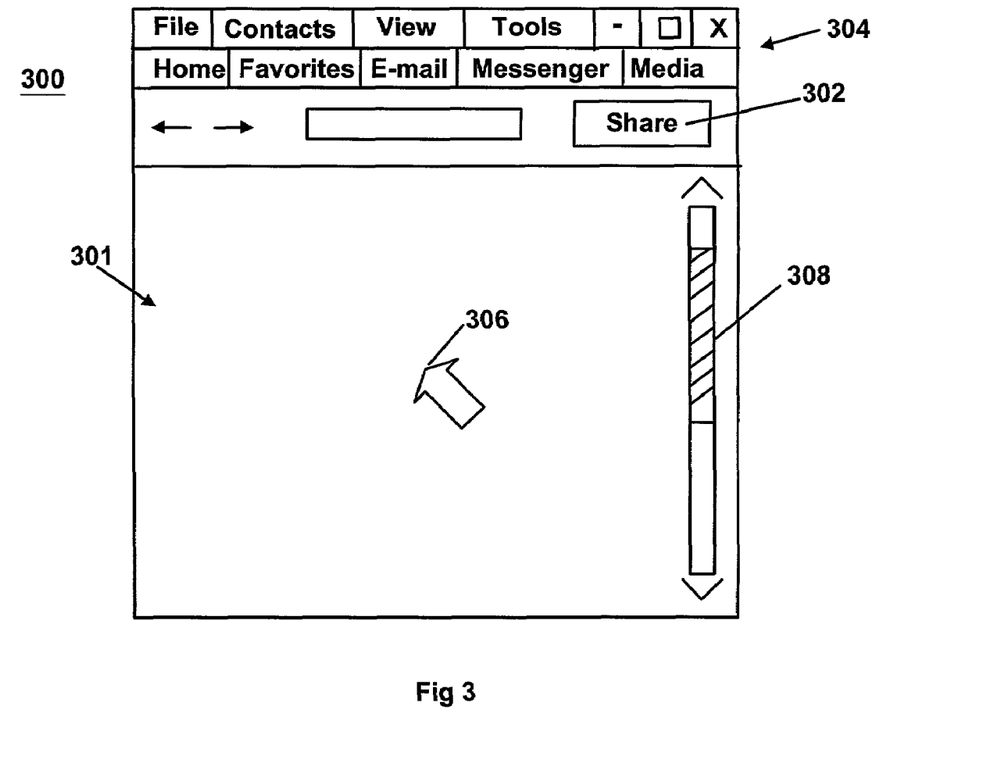
FIG. 3 depicts an exemplary embodiment of a browser window according to the invention.

FIG. 3 depicts an exemplary embodiment of a browser window 300 according to the invention. As shown, the browser window 300 can include a user interface component 302 via which the inviter can initiate a shared browsing session with an online co-user. Preferably, the browser includes a user interface component 302 provided specifically for this purpose, such as a button or pull down menu, for example, which can be integrated into the browser frame 304. According to the invention, selecting the share browsing user interface component 302 results in the user's being presented with his contacts list. The inviter can then select from among the online co-users presented in the contacts list, and initiate a shared browsing session with one or more of them. Thus, the inviter can be provided with an opportunity to select one or more online co-users for a shared browsing experience.

Preferably, a cursor 306 is displayed at a location within the browser window 301. The user can move the cursor 306 within the browser window 301 by moving the mouse (not shown) that is associated with the user's computer. Preferably, a scroll bar 308 is displayed along an edge of the browser window 301. The scroll bar 308 depicts a position of the web page that is currently being displayed relative to the browser window.

As described in detail below, once a shared browsing experience is established, a new, shared browser window can be launched on the inviter computer (see FIG. 5). Preferably, the shared browser window includes a co-browsing toolbar that provides status about the establishment of the shared browsing experience (e.g., "waiting for [invitee] to accept your invitation"). When the invitee accepts the invitation to establish the co-browsing experience, whatever page the inviter is currently viewing is downloaded to the invitee computer. That is, the inviter can continue to navigate while the invitation is pending.

Figure 4:
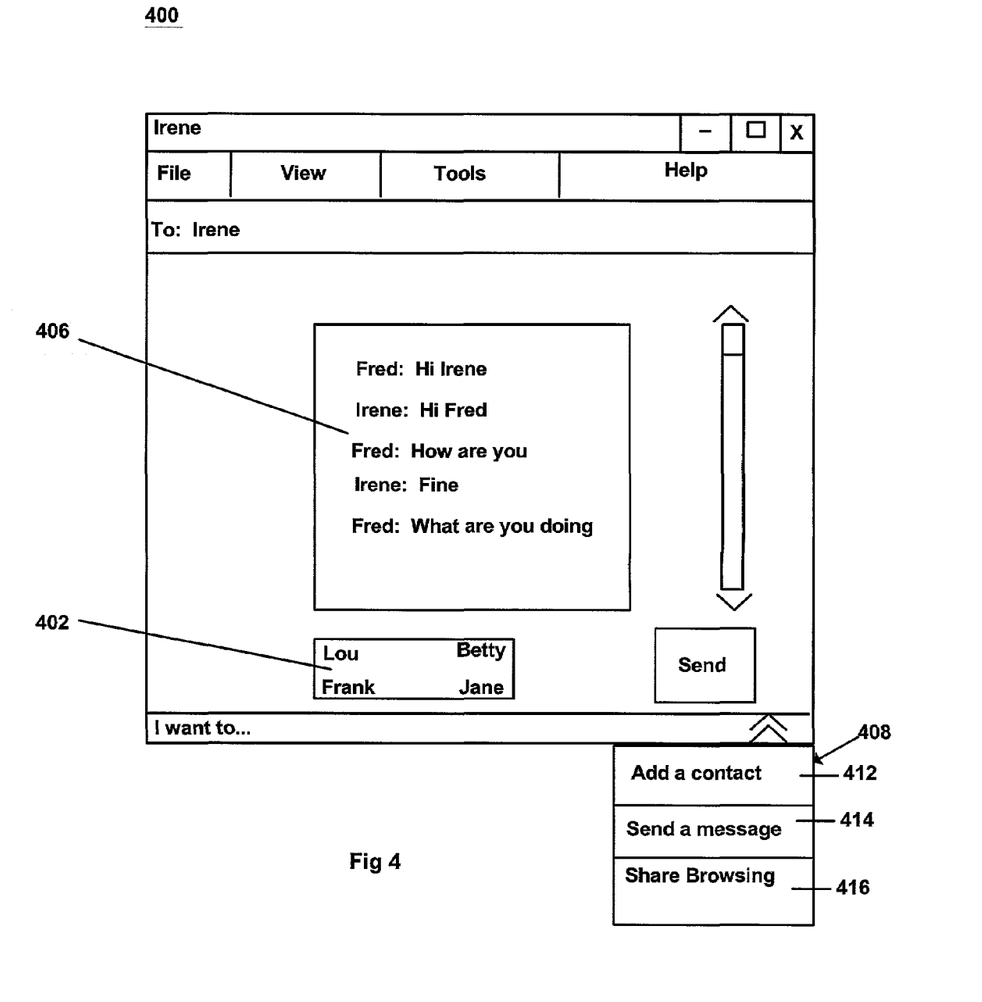
FIG. 4 depicts an exemplary embodiment of an online message window according to the invention.

FIG. 4 depicts an exemplary embodiment of an online message window 400 according to the invention. Such an online message window can be provided by an instant message service. Such an instant message service typically provides a window via which a user can determine whether one or more of a number of pre-specified online co-users is currently online. Such a service also typically enables the online co-users to exchange instant messages.

As shown, the message window 400 can include a contacts list 402. A contacts list 402 is basically a list of IDs or friendly names associated with each of a number of pre-specified online co-users (or "contacts") that the user has previously defined. The contacts list 402 can display all pre-specified co-users along with an indication as to whether they are currently online, or it can display only those that are currently online.

The message window also provides a "chat" area 406 wherein communications between co-users can be viewed. That is, as the user of the computer on which the message window 400 is displayed types, message text appears in the chat area 406. Similarly, when an instant message from a remote co-user (with whom the user is currently conversing) arrives, the message text is displayed in the chat area 406.

The message window 400 can also include a features list 408 that provides a list of features that the instant message service offers. The features list 408 can include, among other things, user interface components that the user can select to activate certain features that the instant message service offers. For example, as shown in FIG. 4, the user can select "add a contact" 412, "start a conversation" 414, or "share browsing" 416.

According to the invention, the inviter can initiate a co-browsing experience via a user interface component that is provided as an integral part of the messenger window 400, either directly from the contacts list 402, the conversation window 406, the features list 408, or anywhere else in the messenger window 400. Preferably, if the inviter selects share browsing from within the conversation window 406, the inviter computer automatically assumes that the co-user to whom the invitation is to be sent is the co-user with whom the inviter is currently conversing. Thus, the inviter computer attempts to establish a co-browsing session between the inviter computer and that co-user's computer, without requesting that the inviter specify a co-user.

Preferably, if more than two users are chatting (or if an attempt is made to initiate a shared browsing experience from a location other than the conversation window), then the inviter computer can provide a user interface via which the inviter can select which of a plurality of pre-specified co-users to invite into a shared browsing session. If an attempt is made to initiate a shared browsing experience from the conversation window, then a new browser window is launched in sharing mode.

In a preferred embodiment of the invention, clicking on a shared browsing launch point to initiate a shared browsing experience can cause a number of things to occur. For example, the browser window is preferably switched into "sharing" mode. If the inviter initiated the shared browsing experience from a browser window, then the browser window is modified to include user interfaces that are related to the shared browsing experience (such as by displaying a status bar, for example). If the inviter initiated the shared browsing experience from a different launch point (from the message window, for example), then the inviter client launches a new browser window in sharing mode.

Preferably, if the inviter initiates a shared browsing experience from the browser, then the messenger conversation window is provided on the inviter computer (in the background and in the taskbar) with the invitation in the messenger's history window. If the inviter initiates the shared browsing session from the conversation window itself, then the invitation can appear in the history window.

Figure 5:
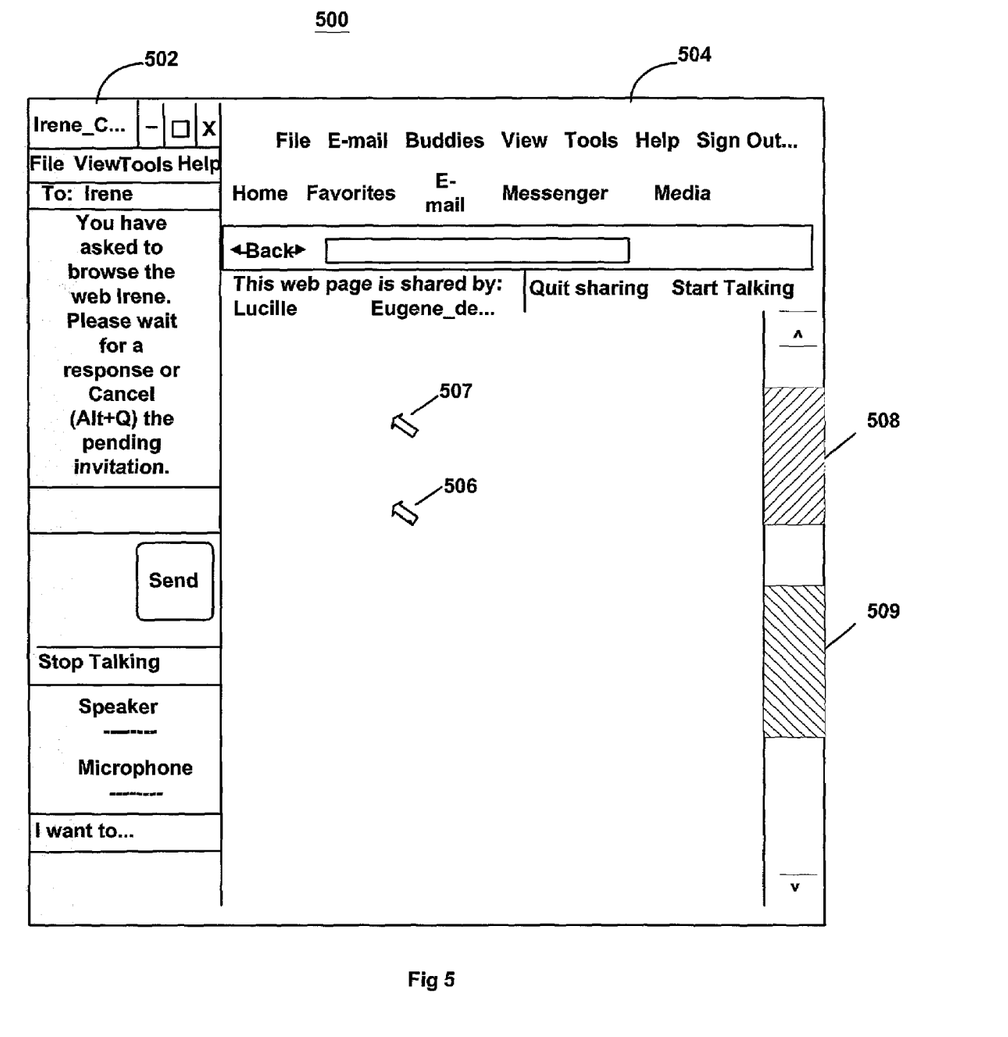
FIG. 5 depicts an exemplary embodiment of a user interface according to the invention that provides unobscured access to each of an online message window and a browser window.

FIG. 5 depicts an exemplary embodiment of a user interface 500 according to the invention that provides unobscured access to each of an online message window 502 and a browser window 504. Preferably, the browser window 504 and the message window 502 are arranged such that a user of the inviter computer has unobscured access to each of the online message window 502 and the browser window 504. Similarly, at the invitee computer, a user interface is provided that includes a browser window and an online message window arranged such that a user of the invitee computer has unobscured access to each of the online message window and the browser window.

In a preferred embodiment of the invention, when an inviter initiates a shared browsing session from the messenger window (shown in FIG. 3), the messenger window resizes and repositions itself next to the shared browser window. In a preferred embodiment, the messenger window 502 is positioned approximately five pixels away from the browser window 504. Thus, the user has unobscured access to both the browser functions and the instant messenger services. Such a user interface also provides the "look and feel" that the user is actually using only one window. It should be understood that the messenger window and browser window could be integrated into a single window, if desired.

FIG. 5 shows that the browser window 504, in sharing mode, can include a cursor 506 at a first position within the browser window. The cursor 506 is controlled by the mouse at the computer on which the browser window is being displayed. The browser window 504 can also include a remote cursor indicator 507 that represents a current position of a cursor within a browser window at a remote client computer. Preferably, the remote cursor indicator 507 comprises a ghosted cursor that represents the current position of the cursor within the browser window at the second client computer. Thus, the ghosted cursor 507 can provide an indication as to where the other co-user's cursor is currently positioned on the web page that the two co-users are sharing.

Preferably, each co-user can see his own cursor, as well as the co-user's. The couser's cursor is designed to confirm that the page is shared, and also to give the user a rough idea of what the remote co-user is looking at. If the remote co-user's cursor is off the shared window, then the ghosted cursor can be made to appear on the edge of the user's screen that corresponds most nearly to the position of the actual cursor on the remote computer's screen.

In sharing mode, the browser window 504 can also include a scroll bar or page thumbnail 508 that depicts a position of the web page that is currently being displayed relative to the browser window 504. The browser window 504 can also include a remote scroll bar indicator 509 at a position within the browser window that corresponds to a current scroll position of a web page within a browser window at a remote client computer. Preferably, the remote scroll bar indicator 509 comprises a ghosted scroll bar at the position within the browser window 504 at the first client computer that corresponds to the current scroll position of the web page within the browser window at the second client computer. Thus, although each user can scroll independently of the other, the ghosted scroll bar 509 can provide an indication as to where the web page that the two co-users are sharing is currently positioned within the other computer's browser window. That is, the ghosted scrollbar offers each user a rough idea of what part of a web page that the other user is currently looking at. Preferably, as one user scrolls, the other sees the ghosted scrollbar move behind hers.

In a preferred embodiment of the invention, the browser window depicted in FIG. 5 can also include a status display 510 that provides a current status of the shared browsing experience. For example, the browser window at the inviter computer can provide a status display that provides a current status of a browsing experience at the invitee computer. Similarly, a status display can be provided at the invitee computer that provides a current status of a browsing experience at the inviter computer. Preferably, the status display is integrated into the browser window, though it should be understood that the status display can be integrated into any other window, or provided as a separate window, without departing from the spirit of the invention.

Figure 6A:
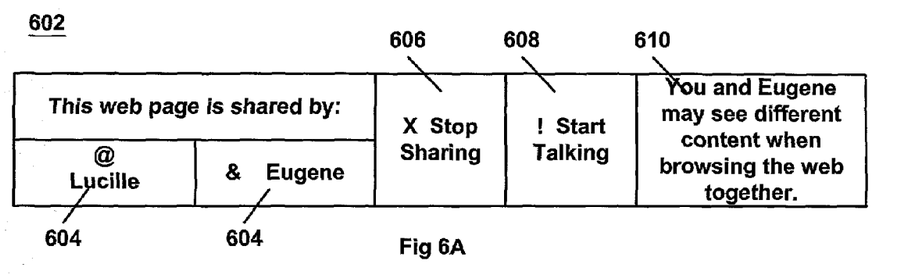
FIGS. 6A through 6E depict status displays according to the invention for providing status of a shared browsing session.

FIGS. 6A through 6E depict a status display according to the invention for providing status of a shared browsing session. FIG. 6A shows a status display 602 that provides a status as to which co-users are currently sharing the browsing experience. The status display 602 can include a user interface component 604 that provides a picture, if desired, and friendly name for each of the co-users (e.g., "Lucille" and "Eugene") as shown. The status display can also include a user interface component 606 that the user can select to terminate the shared browsing experience, and a user interface component 608 that the user can select to initiate (or continue) an instant message session. The status display can also include a warning message 610 that advises the co-users that, for reasons discussed in detail below, they may be viewing different content when browsing the web together.

Figure 6B:
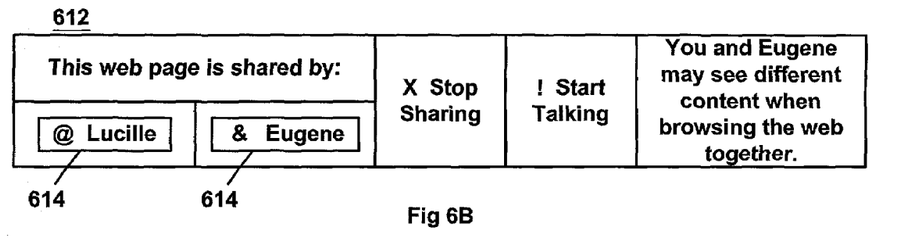

FIG. 6B depicts a status display 612 that provides download status 614 of a web page that the co-users are currently downloading. Thus, each co-user can determine whether, and at what point, the other co-user(s) are able to view a completely downloaded web page. This is desirable because the several clients will not, in general, be able to download the web pages at exactly the same rate and, therefore, will likely not be in perfect synchronization until the web page has been completely downloaded on each of the computers. Preferably, the status display includes a progress bar that indicates the percentage of the web page that each user has downloaded. As shown, the download status 614 corresponding to each co-user can be provided as a respective progress bar that increases in size until the page is completely downloaded. When a user has completely loaded a page, the progress bar can be made to disappear. The picture and friendly name of the contact can be made to remain.

Figure 6C:
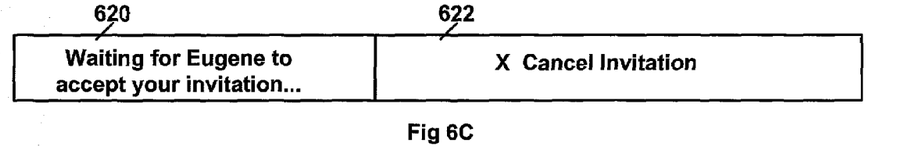

FIG. 6C depicts a status display 620 that can be displayed at the inviter computer while the invitation is pending (i.e., during the period between the time the inviter attempts to initiate the shared browsing session until the time the invitee accepts the invitation and thereby agrees to establish a shared browsing session). During that period, the inviter can cancel the invitation (and thereby abort the attempt to establish the shared browsing session) by selecting the "cancel invitation" button 622. It should be understood that a similar display can be provided at the invitee computer, which indicates to the invitee that the inviter has invited the invitee to share in a browsing session. If the invitee declines the invitation, then the inviter's toolbar can be made to disappear, and the appropriate rejection message can be displayed in the conversation history.

Figure 6D:
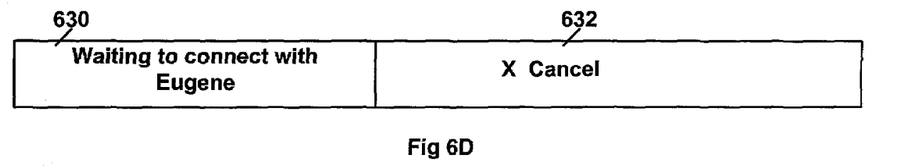

FIG. 6D depicts a status display 630 that can be displayed at the inviter computer during the period between the time the inviter accepts the invitation to establish a shared browsing session until the time the shared browsing session is actually established. During that period, a co-browsing connection is established (as will be described below in detail) between the inviter computer and the invitee computer. The inviter can terminate the connection process (and thereby abort the attempt to establish the shared browsing session) by selecting the "cancel" button 632. It should be understood that a similar display can be provided at the invitee computer, which provides the invitee with the capability to terminate the connection process (and thereby abort the attempt to establish the shared browsing session).

Figure 6E:
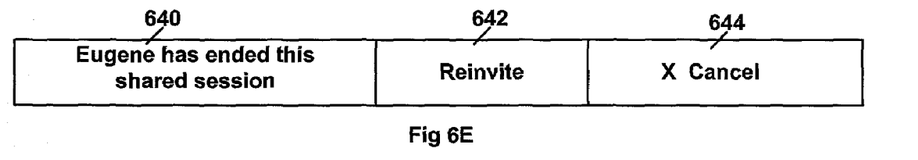

FIG. 6E depicts a status display 640 that can be displayed at the inviter computer after the invitee has elected to end the shared browsing session. The status display 640 can include an option 642 via which the inviter can "re-invite" the invitee to share in another browsing session, and an option 644 via which the inviter can exit shared browsing mode and return to conventional browsing.

Preferably, if a co-user signs out of the messenger service, or if status is not available because the user is not on the contacts list, the status display can so indicate to the user. For example, clicking on a status icon can show a relevant error message. Preferably, if the user clicks in the appropriate status area when there is an error/warning message, information on the appropriate help topic can be provided.

Figure 7:
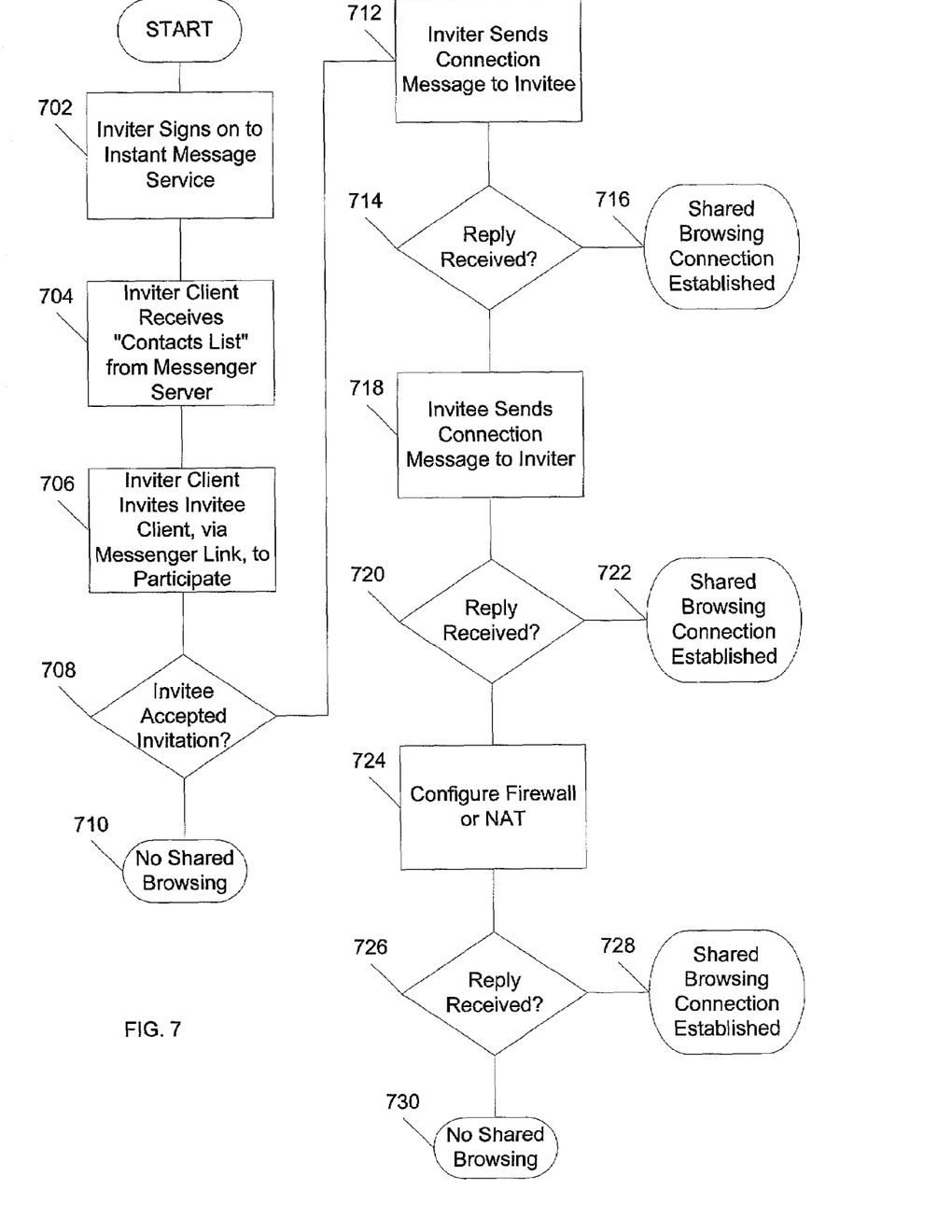
FIG. 7 is a flowchart of a preferred embodiment of a method according to the invention for establishing a shared browsing experience among a plurality of online co-users.

FIG. 7 is a flowchart of a method 700 according to the invention for establishing a shared browsing experience among a plurality of online co-users. At step 702, the inviter signs on to an online message service, thereby causing the inviter computer to establish a connection, via the communications network, to the online message server. Thus, a first communication path is established, between the inviter computer and the online message service, and, where the network based communication service is an online message service, can be referred to as an "online messenger communication path." It should be understood, however, that the first communication path can be any connection between the inviter client and the network based communication service, and need not necessarily be with a Web server.

At step 704, the inviter computer retrieves a list of pre-specified online co-users (i.e., "contacts list") from the online message service. The online co-user list indicates which, if any, of the online co-user accounts that the invitee has pre-specified are currently active. That is, the online co-user list indicates which of the pre-specified co-users are currently online (i.e., also signed in to the online message service). The online co-user list can also include an address, such as an IP address, associated with the respective computers on which the pre-specified co-users are currently logged in. Alternatively, the message service can maintain this address information, but not necessarily provide it to the inviter computer. Thus, the inviter can then determine whether any of the pre-specified online co-user accounts is currently active on an invitee computer.

At step 706, the inviter selects an option to initiate a shared browsing session with one or more of the online co-users in the inviter's contacts list. In a preferred embodiment of the invention, clicking on a contact ID in the contacts list causes a conversation window with that contact to be provided at the inviter computer. As described above, the inviter can initiate a shared browsing session by selecting a "share browsing" option from either the browser window or the messenger window. In response to inviter's selection of the option to initiate a shared browsing session with one or more of the pre-specified online co-users, the inviter computer sends to the invitee computer, via the online messenger communication path, an invitation to establish the co-browsing experience between the inviter computer and the invitee computer. Preferably, a text-based formatting language that encapsulates data, such as XML, for example, is used for communications between the client computers over the online messenger path.

It is contemplated that shared browsing among a plurality of online co-users can be implemented as (or as part of) a paid subscription service. In such an embodiment, it would be desirable to enable only a paid subscriber to initiate a shared browsing session. To encourage users who wish to use the co-browsing service to become paid subscribers, a user interface can be provided to advise the inviter that the capability requested requires a paid subscription. A subscription user interface, via which the inviter can subscribe to the service, can then be offered. Preferably, the subscription user interface provides information about the service and is presented in a way that encourages the user to subscribe. According to the particular embodiment of the invention, a paid subscriber can be enabled attempt to establish a shared browsing experience with any online co-user (i.e., any other user that is currently signed into the online message service), or only to those pre-specified co-users that are on the user's contact list.

As described above, when the invitation is sent, the shared browsing window opens on the inviter's screen. Preferably, the status area indicates that the invitation is pending, but browsing capability is otherwise fully enabled. If the invitee declines the invitation, the status bar can be made to disappear from the browser window at the inviter computer, and the inviter can be notified (preferably, in the conversation window of the message window) that the invitation has been declined.

Preferably, the invitation is "brokered" via existing session invite API included in the online message service. That is, the invitee sees the invitation just like any other session invite that the online message service provides. For example, where Microsoft Messenger is the online message service, the invitation can be provided via a Messenger conversation window. The invitee can then accept or decline the invitation, thereby causing the invitee computer to send to the inviter computer, via the online messenger communication path, an indication that indicates whether the invitee has accepted or declined the invitation.

If, at step 708, the inviter computer determines that the invitee has declined the invitation, then, at step 710, no shared browsing session is established. However, if the inviter computer determines at step 708 that the invitee has accepted the invitation, then the inviter computer attempts to establish a shared browsing session on a second, or "co-browsing," communication path 30 (see FIG. 2), between the inviter computer and the invitee computer. Preferably, the co-browsing communication path includes a peer-to-peer connection between the two clients, and can be based on any protocol that is mutually agreeable to the sharing clients, such as the well-known point-to-point tunneling protocol, for example.

In a first attempt to establish the co-browsing communication path, the inviter computer, at step 712, communicates to the invitee computer, via the online messenger communications path, a connection message that identifies an available port of the inviter computer. Thus, the inviter computer can use the online messenger path to establish the co-browsing communication path. In such an embodiment, the online message service can provide a relatively small amount of bandwidth for the computers to use in setting up the co-browsing path. Additionally, because the clients are hosting online co-users, the online messenger path is a guaranteed path between the clients.

The inviter computer "listens" for a reply message to be received from the invitee computer via the identified port. If, at step 714, a reply is received via the identified port of the inviter computer, then, at step 716, a second communication path is defined between the identified port and the invitee computer, and a shared browsing session can begin. Preferably, the reply identifies an available port of the invitee computer and the second communication path is defined between the identified port of the inviter computer and the identified port of the invitee computer. Thus, a shared browsing session between the inviter computer and the invitee computer can be established.

If the invitee computer is unable to connect to the available port of the inviter computer at step 714 (because, for example, the inviter computer is behind a NAT or firewall that will not permit a connection based on an incoming request for one), then, at step 718, the invitee computer can send a connection message to the inviter computer via the first communication path. Preferably, the connection message identifies an available port of the invitee computer. In response, the inviter computer sends a reply message to the invitee computer via an available port of the inviter computer. If, at step 720, the invitee computer determines that a reply has been received, then, at step 722, the second communication path is defined between the identified port of the invitee computer and the available port of the inviter computer, and a shared browsing session is established.

At step 724, an attempt is made to configure the NAT or firewall to establish a connection between the inviter client and the invitee client. Preferably, a generic protocol, such as Universal Plug and Play (UPnP) can be used. If a reply is received, at step 726, then, at step 728 the second communication path is defined between the identified port of the invitee computer and the available port of the inviter computer, and a shared browsing session is established. Thus, a peer-to-peer connection can be made through NATs and firewalls. If, at step 726, a reply is not received, then, at step 730, the system concludes that it is unable to establish a second communication path, and, therefore, unable to establish a shared browsing session. Preferably, both the inviter and the invitee are notified that the shared browsing session has not been established.

In a preferred embodiment of the invention, a shared browsing session can be established for any or all of the following classes of users: modem dial-up users, DSL, cable modem, satellite, multiple users on a home network (e.g., LAN, through a hub at home, etc.), users behind NATs, wireless 802.1x users, and the like.

Assuming that a co-browsing communication path can be established between the inviter computer and the invitee computer, a shared browsing session can begin. According to the invention, during a shared browsing session, when one user navigates the shared browser, the other user navigates, automatically, as well. Preferably, synchronization between the two users is maintained. That is, if both users are in a resting state (neither has a page downloading), they should be viewing the same page.

During the shared browsing session, information relating to the co-browsing browsing experience is communicated between the inviter computer and the invitee computer via the co-browsing communications path. That is, the inviter computer communicates to the invitee computer, via the second communication path, information relating to a browsing experience at the inviter computer, and receives from the invitee computer, via the second communication path, information relating to a browsing experience at the invitee computer. Similarly, the invitee computer communicates to the inviter computer, via the second communication path, information relating to a browsing experience at the invitee computer, and receives from the inviter computer, via the second communication path, information relating to a browsing experience at the inviter computer. Thus, after the invitee accepts the invitation, the invitee client can provide a shared browser window, such as described above, and the invitee will be enabled to navigate, etc., just as he would from his ordinary browser widow.

The information relating to a browsing experience that is communicated between the inviter computer and the invitee computer can include, without limitation, cursor position, load progress, frame navigation data, window navigation data, and scroll bar position. The browser at the computer that receives the information uses the received information to present a browsing experience that matches, to the extent possible, the browsing experience at the computer that sent the information. Preferably, all commands are UTF-8 encoded, and arguments are pipe-delimited. It is contemplated that the protocol may be implemented in an XML schema.

In a preferred embodiment, cursor position is represented as a long integer string. The high word of this 32-bit value represents the X position as a ratio to the window width, in the range 0-1000; the low word represents the Y position. Cursor data can also include the dimensions of the window, screen resolution, and the like. Scroll bar position can also be represented as a long integer string, wherein the high word represents the thumb position as a ratio to the window height (in the range 0-1000), and the low word represents the thumb size. Load progress can be represented as a long integer string having a value that represents the page load progress (in the range 0-1000).

Frame navigation information can include a frame name, navigation ID, and a URL. Window navigation information can include navigation ID and an URL. The frame name is the name of the frame element in the HTML DOM. The navigation ID can be a string representing an unsigned long integer. This value represents a serial number assigned to this atomic navigation. When two of these commands are sent with the same number from different peers, commands from the invitee are ignored. Thus, if two co-users are sharing a browsing session, and simultaneously attempt to navigate, the inviter's navigation command controls the shared browsing session, and the invitee's command is ignored.

An URL can be a simple URL relating to a site, so that each co-browsing client can retrieve the same web page concurrently. The URL, however, can be a more complex URL relating to a form. Currently, there are two kinds of forms supported by the web: HTTP GET and HTTP POST. In the case of an HTTP GET form, the information that the user fills out is encoded into the URL and sent as part of the URL. HTTP POST data, however, comes in the form a string or "text blob." In the HTTP protocol, the end of the blob is typically denoted by "\r\n" (carriage return, new line). In a preferred embodiment of the invention, the text blob is prepended by the length of the blob and does not necessarily end with "\r\n." Thus, the receiving client can also "post" the same form to the web server and get the same results.

In a preferred embodiment of the invention, only one co-browsing session can be established between two online co-users at a time. Thus, if two co-users simultaneously invite each other to share a browsing experience, only one is enabled to accept. That is, as a result of one co-user's accepting the other's invitation, the other invitation is automatically cancelled.

If a user already has a shared browsing session running (or pending) and clicks on the "share web page" within the online message service's conversation window with the same user, then the shared browser window can be brought to the foreground. Preferably, users can be enabled to open another shared window by explicitly requesting another window. If one co-user requests another window from the shared window, then the new window can also be shared and made to appear on the other co-user's machine.

Preferably, a user already having a shared browsing session running (or pending) can initiate an additional session, with another co-user. In this case, another shared browsing window can be made to appear for the second co-browsing session. Similarly, in a preferred embodiment, a co-user may be invited to share in a browsing session with a third co-user, even if the first co-user is already participating in a shared browsing session with a second co-user.

Preferably, when a user tries to navigate to a secure website, a message dialog is provided to indicate that the requested website is a secure website that cannot be shared. The requesting user is informed that a new, unshared window can or will be opened to display the requested web page. If the user elects to have a separate, unshared window displayed, then such a window is displayed. Otherwise, navigation to the requested secure site can be canceled.

If one of the co-browsing co-users has a site blocked due to content filtering, a screen in the browser can be provided to indicate that. At the same time, the requesting co-user can be notified that the current screen is not being shared due to restrictions on the filtered couser's machine. Alternatively, to protect the filtered co-user's "coolness" (i.e., to avoid the embarrassment of having to admit to his friend that his mom won't allow him see something), the requesting co-user need not be so informed. Thus, the requesting co-user can continue to navigate and not know that the filtered co-user is being blocked. If the filtered co-user chooses, he can use the instant message service to inform the other co-user that he is unable to share in the current browsing experience. When either user navigates to a page that both can view, shared browsing resumes. Preferably, this aspect of the invention can be implemented using content filtering or parental controls used in an ordinary browsing.

In the case of "personalized websites," both co-users can be provided with a warning that indicates that the requested web page contains personalized content and, therefore, that they might not be seeing the identical page. For example, the users might have certain web pages, such as a home page, for example, that uses cookies to customize the content to the user's preferences.

Either user can terminate a co-browsing session by selecting an "end session" button, for example, in the shared browser window, or by closing all shared windows. Preferably, at the end of a shared browsing session, the status bar disappears for the user who terminated the session. For the other user, the status bar preferably indicates that the first user has ended the shared browsing session. The user who did not terminate the session can then be provided with several options. For example, the user can be enabled to "re-invite" the terminating co-user back into a shared browsing session. If it is not possible to re-invite the terminating co-user (e.g., if the terminating co-user is no longer online), then this option need not appear.

Preferably, the shared browsing session ends implicitly if either user closes all of the shared browsing windows that they have with a given co-user, or the connection is otherwise lost. In this case, the user who did not close the window(s) can be provided with an indication in the status bar that the session has ended. Since the other user is not available, they preferably are not provided with a "re-invite" option.

Thus, there have been described systems and methods for establishing a shared browsing session among a plurality of online co-users. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

The invention claimed is:

1. A method for sharing a browsing experience, the method comprising:
   determining, at an inviter computer, whether a pre-specified online co-user account is currently active on an invitee computer;
   sending to the invitee computer, via an online messenger communication path, an invitation to establish a co-browsing experience between the inviter computer and the invitee computer;
   receiving an acceptance of the invitation from the invitee computer;
   establishing a co-browsing communication path between the inviter computer and the invitee computer;
   communicating information relating to the co-browsing browsing experience between the inviter computer and the invitee computer via the co-browsing communications path;
   receiving from the invitee computer, data relating to a current position of a cursor within a browser window at the invitee computer;
   displaying a remote cursor indicator at a position within a browser window at the inviter computer that corresponds to the current position of the cursor within the browser window at the invitee computer; and
   determining if a webpage selected by the inviter computer is blocked at the invitee computer, and if so, preventing the webpage from being displayed at the invitee computer, and further preventing a user of the inviter computer from determining that the webpage was blocked at the invitee computer.

2. The method of claim 1, further comprising:
   providing an online message window at the inviter computer;
   providing a browser window at the inviter computer; and
   arranging the online message window and the browser window, in response to receiving the acceptance from the invitee computer, such that a user of the inviter computer has unobscured access to each of the online message window and the browser window.

3. The method of claim 1, further comprising:
   providing at the inviter computer, in response to receiving the acceptance from the invitee computer, a user interface that includes a browser window and an online message window arranged such that a user of the inviter computer has unobseured access to each of the online message window and the browser window.

4. The method of claim 1, wherein displaying the remote cursor indicator at the inviter computer comprises displaying a ghosted cursor at the position within the browser window at the inviter computer that corresponds to the current position of the cursor within the browser window at the invitee computer.

5. The method of claim 1, further comprising:
   receiving from the invitee computer, data relating to a current scroll position of a web page within a browser window at the invitee computer; and
   displaying a remote scroll bar indicator at a position within a browser window at the inviter computer that corresponds to the current scroll position of the web page within the browser window at the invitee computer.

6. The method of claim 5, wherein displaying the remote scroll bar indicator comprises displaying a ghosted scroll bar at a position within the browser window at the inviter computer that corresponds to the current scroll position of the web page within the browser window at the invitee computer.

7. The method of claim 1, further comprising:
   providing a status display at the inviter computer that provides a current status associated with the browsing experience at the invitee computer.

8. The method of claim 7, wherein the status display includes status relating to load progress of a web page being downloaded onto the invitee computer.

9. The method of claim 7, wherein the status display includes online messenger status.

10. A method for sharing a browsing experience, the method comprising:

determining, at an inviter computer, whether a pre-specified online co-user account is currently active on an invitee computer;

sending to the invitee computer, via an online messenger communication path, an invitation to establish a co-browsing experience between the inviter computer and the invitee computer;

receiving an acceptance of the invitation from the invitee computer;

establishing a co-browsing communication path between the inviter computer and the invitee computer;

communicating information relating to the co-browsing browsing experience between the inviter computer and the invitee computer via the co-browsing communications path;

receiving from the invitee computer, data relating to a current position of a cursor within a browser window at the invitee computer;

displaying a remote cursor indicator at a position within a browser window at the inviter computer that corresponds to the current position of the cursor within the browser window at the invitee computer; and determining if a webpage selected by the invitee computer is blocked at the inviter computer, and if so, preventing the webpage from being displayed at the inviter computer, and further preventing a user of the invitee computer from determining that the webpage was blocked at the inviter computer.

11. The method of claim 1, wherein the information relating to the co-browsing browsing experience includes a URL.

12. The method of claim 1, wherein the information relating to the co-browsing browsing experience includes a URL relating to a form.

* * * * *